United States Patent [19]

Verrico

[11] Patent Number: 4,702,925

[45] Date of Patent: Oct. 27, 1987

[54] METHOD AND APPARATUS FOR SPRAYING SNOW-LIKE FROSTING ONTO FOOD STUFF PARTICLES

[75] Inventor: Marsha K. Verrico, Fair Lawn, N.J.

[73] Assignee: Nabisco Brands, Inc., Parsippany, N.J.

[21] Appl. No.: 710,400

[22] Filed: Mar. 11, 1985

[51] Int. Cl.$^4$ .............................................. A23L 1/164
[52] U.S. Cl. ...................................... 426/96; 426/103; 426/293; 426/302; 426/618; 426/621; 426/471
[58] Field of Search ................. 426/96, 293, 103, 471, 426/302, 309, 618, 621; 118/13

[56] References Cited

U.S. PATENT DOCUMENTS

| | | | |
|---|---|---|---|
| 3,557,718 | 1/1971 | Chivers | 426/291 |
| 3,615,676 | 10/1971 | McKown et al. | 426/293 |
| 3,814,822 | 6/1974 | Henthorn et al. | |
| 4,089,984 | 5/1978 | Gilbertson | 426/305 |
| 4,338,339 | 7/1982 | Edwards | 426/291 |
| 4,379,171 | 4/1983 | Furda et al. | 426/303 |

*Primary Examiner*—Jeanette Hunter
*Attorney, Agent, or Firm*—Richard Kornutik

[57] ABSTRACT

This invention is a method for applying a sweetener to a food stuff. In the preferred method the frosted coating of sweetener has a snow-like appearance. The apparatus used has a means for atomizing and spraying a sweetener solution onto food stuff particles and a means for drying the sprayed food stuff particles using compressed room temperature air.

8 Claims, 1 Drawing Figure

METHOD AND APPARATUS FOR SPRAYING SNOW-LIKE FROSTING ONTO FOOD STUFF PARTICLES

BACKGROUND OF THE INVENTION

1. Field Of The Invention

This invention relates to an apparatus for applying frosting to food stuffs. In particular, this invention relates to an apparatus and a method for applying a frosting to food stuffs that can have a snow-like appearance.

2. Description Of The Prior Art

Topically sweetened food stuffs such as breakfast cereals, pastries, and cookies are well known and have been sold on the market for many years. It is known in the industry that coating food stuff particles with a sweet substance enhances the palatability as well as the marketability of these products. Sweetened coatings can be used to change the appearance of food stuffs to improve their marketability. The discussion of this invention is directed primarily to frosted ready-to-eat cereal particles, but the usefulness of the invention is not limited to cereal products or any particular food stuff.

Frosted cereals are typically prepared by coating the cereal pieces with a solution of sweeteners and then drying the coated pieces. Generally, processes for coating cereal pieces can be achieved by numerous methods known in the art including, stirring the solution and cereal pieces in a container, tumbling the solution and cereal pieces in a rotating drum, or spraying the solution onto the cereal pieces.

Sugar is generally used as the primary ingredient in the sweetening solution. Different types of sugars useful as frosted coatings are known in the art. The most commonly used sugar has been sucrose. Other usable types of sugar include dextrose, glucose, corn syrup, honey, and fructose. Fructose has the characteristic of being sweeter than sucrose. This characteristic is often utilized to produce pre-sweetened ready-to-eat cereals that provide traditional levels of sweetness at reduced concentrations of sucrose. Artificial sweeteners can also be used to coat cereal products.

U.S. Pat. No. 4,379,171 to Furda et al. discloses a typical method for coating cereal pieces with a mixture of crystalline fructose and high fructose corn syrup. The cereal food pieces are enrobed with a heated edible oil and then dusted with a dry powdered sugar.

U.S. Pat. No. 4,089,984 to Gilbertson discloses a ready-to-eat breakfast cereal that is coated with a liquid sweetener such as honey or corn syrup. The liquid sweetener is heat treated to evaporate much of its moisture as it is applied to the cereal pieces. Stickiness is eliminated by coating the cereal particles as cooling takes place with a powdered material, such as finely divided protein or wheat germ.

The inventions above do not provide methods that make significant changes to the appearance of the cereal pieces. These inventions do not produce a cereal piece with a snow-like frosting that remains hard during storage and is not sticky to the touch. Also, these inventions do not provide an apparatus that continuously applies a sweetened frosting to a foods stuff followed by continuous rapid drying of the frosting.

Regardless of the type of sugar used, the form of sugar used is either in a crystalline state or in a noncrystalline state. In its crystalline state, sugar is nonsticky, nonhygroscopic, and has a white or "frosted" appearance. In its noncrystalline state, sugar is relatively sticky, hydroscopic and has a hard, transparent, or glass-like appearance.

A cereal piece can be coated with noncrystalline sugar in a number of ways. In one instance, the cereal piece can be coated with a sugar solution having a small amount of moisture, for example 5% or less. After it is applied to the cereal product and allowed to cool, the resulting product is a hard, clear coating. Alternatively, a cereal piece can be coated with a noncrystalline sugar by making a sugar solution with a moisture content as high as about 35% and applying it to form a thin film over the surface of the cereal.

U.S. Pat. No. 3,557,718 to Chivers discloses a process for making a sweetened cereal wherein pieces of ground candy floss are applied to moistened surfaces of the cereal. In this invention crystalline sugar is ground into small pieces and added to water and then sprayed onto a tumbling mass of cereal piece. This results in the cereal pieces being coated with a sticky slurry. The coated pieces are then dried in an oven to reduce their moisture content. A hard glaze coating forms on the pieces. The initial crystalline sugar is converted to a noncrystalline state in the final product.

U.S. Pat. No. 4,338,339 to Edwards discloses a process for producing a frosted breakfast cereal. In this patent the breakfast cereal product is coated with seed crystals of dextrose and sucrose. An aqueous solution of dextrose and sucrose is then uniformly applied to the surface of the cereal. The moisture content of the cereal is reduced by drying at a temperature below that which can cause browing of the cereal product's crystalline sugar. The resulting product is a frosted breakfast cereal such as corn flakes, puffed wheat, or puffed rice.

U.S. Pat. No. 3,615,676 to McKown et al. discloses a crystalline sugar coated cereal and the process for producing it. This invention discloses a process in which individual cereal piecea are coated with relatively coarse crystalline sugar granules. The process includes mixing the cereal pieces and crystals of sugar together. The granules are made to adhere to the surface of the cereal with the use of an edible binding agent mixed with water. The binding agent solution can be sprayed onto the surfaces of the cereal pieces. The cereal pieces are dried to lower their moisture content, sifted to remove loose pieces of sugar, and then packaged.

U.S. Pat. No. 3,814,822 to Henthorn et al. discloses a process for preparing a breakfast cereal in which hard butter containing crystalline sugar coats the breakfast cereal. The sugar and butter are applied to the cereal in liquid form a slurry. The slurry may be applied by spraying, by tumble enrobing, or by any other conventional method. This process results in a cereal product coated with coarse granules of crystalline sugar.

Sugar in a noncrystalline state has numerous disadvantages. Cereals coated with noncrystalline sugar absorb moisture readily and become sticky. Moisture absorption is detrimental to the cereal's appearance and palatability because it causes the cereal particles to become soft or noncrisp. In contrast, sugar in the crystalline form enhances the storage stability of the cereal because it remains nonsticky and does not absorb moisture as readily as noncrystalline sugar.

Presweetened cereals have an advantage over unsweetened cereals. Before consuming an unsweetened cereal, table sugar and milk are usually added to the cereal. Table sugar does not readily cling or adhere to the cereal particles. Presweetening of a cereal makes it possible for a manufacturer to add an appropriate amount of sugar to cereal particles for sweetness which remains adhered to the cereal particles after moistening with milk.

It is the object of this invention to provide an apparatus and a process for applying a frosting on food stuffs wherein the frosting has a snow-like appearance. The invented apparatus both sprays atomized sweetener onto the food stuff particles and dries the sweetener before the particles are packaged. The appearance of this frosting can have an appearance unlike that of traditional crystalline sugar coated or glazed cereals. This frosting readily adheres to the food stuff pieces and does not readily absorb moisture during storage. The food stuff pieces do not stick together during storage. The resulting product exhibits optimum characteristics of storage, stability, appearance, and palatability.

SUMMARY OF THE INVENTION

Figure 1:
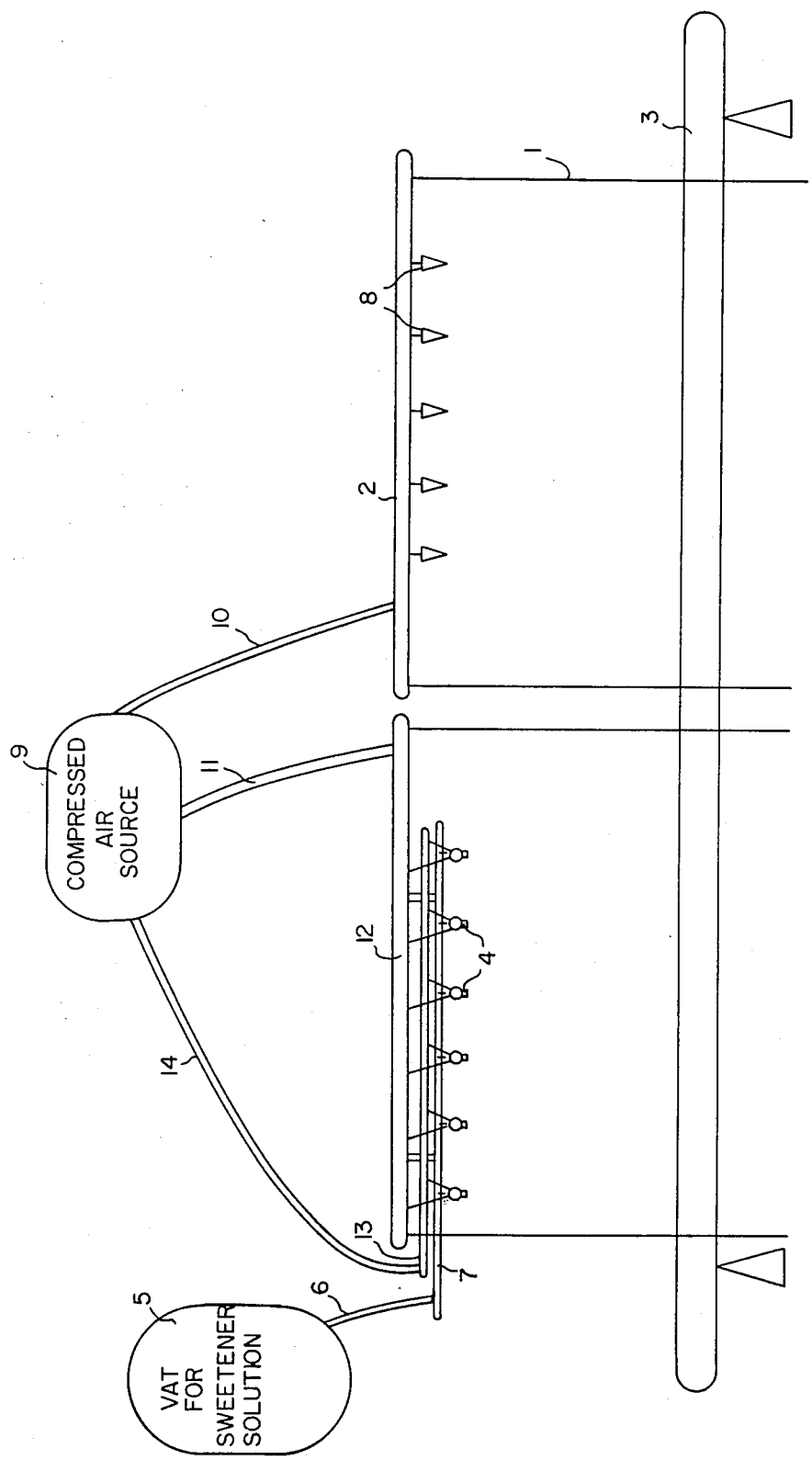
FIG. 1 is a plan view diagram illustrating the arrangement of the major elements of the apparatus.

This invention includes an apparatus comprising a first apparatus section having a means for atomizing a sweetener solution and spraying the atomized sweetener solution onto food stuff particles. This apparatus also comprises a second apparatus section having a means for drying the atomized sweetener solution on the food stuff particles with compressed room temperature gas or air.

This apparatus can include a means for conveying the cereal particles through the first apparatus section and second apparatus section.

Also a part of this invention is a method for applying a snow-like frosting onto food stuff particles comprising conveying a plurality of food stuff particles through an apparatus having a plurality of spray guns mounted in a first section of the apparatus and a feed system, this feed system being fashioned to supply a sweetener solution to the spray guns. The spray guns are fashioned to spray atomized sweetener solution on the food stuff particles being conveyed through the first section of the apparatus. Drying of the frosted coating is performed by the apparatus using a plurality of air flow amplifiers mounted in a second section of the apparatus. The apparatus is connected to a means for supplying food grade clean, compressed air to the spray guns and the air flow amplifiers. The compressed air operates the spray guns and the air flow amplifiers. The air flow amplifiers are mounted to direct a flow of air onto the sprayed food stuff particles being conveyed through the second section of said apparatus such that the air flow dries the sweetener coated food stuff particles.

In the preferred embodiment of the apparatus of the invention cereal pieces are coated with a sweetener made from a mixture of powdered sugar, water, gelatin, and glycerin. The sweetener is sprayed onto the cereal pieces from atomizing spray guns. The sweetener coated cereal particles are dried by air flow amplifiers. The resulting product is a frosted cereal that does not absorb moisture during storage. The cereal remains fresh and crisp and the frosting adheres to the cereal.

Alternative embodiments can include different types of sweeteners which are members of a group consisting of sucrose, dextrose, fructose, glucose, saccharin, aspartame, and mixtures of these.

DETAILED DESCRIPTION OF THE INVENTION

This invention is an apparatus which applies a sweetener to food stuff particles and dries that sweetener. In the preferred embodiment the sweetener on the finished product has a snow-like appearance. This apparatus includes a first apparatus section having a means for atomizing and spraying a sweetener solution onto food stuff particles. This apparatus also has a second apparatus section having a means for drying the sweetener coated food stuff particles by compressed room temperature gas or air. Used in conjunction with the apparatus can be a means of conveying the food stuff particles through the first and second apparatus sections. The means for conveying the food stuff particles through the apparatus is not limiting upon the invention and can be purchased from a number of different sources.

A typical configuration of this invention is an apparatus having a means for conveying or a conveyor belt system which can transport a single layer of a large quantity of cereal particles through the apparatus. Typically, this means for conveying receives cereal particles from an oven as soon as the cereal particles are baked and transports the cereal particles through an optional cooling apparatus and then into the apparatus of this invention. Conveyor belts come in numerous sizes and configurations. A variable speed conveyor system is desirable for use with the apparatus of this invention. Varying the conveyor speed is one means for controlling the amount of sweetener sprayed onto cereal particles as they pass through the first apparatus section of the invention. A slow conveyor belt speed increases the amount of time during which the atomized sweetener is applied to the cereal particles. A fast conveyor belt speed decreases the amount of exposure time and thereby decreases the amount of frosting applied to the cereal particles.

The belts can be made of a solid or a wire mesh material. A wire mesh belt can be desirable because it does not build up a large quantity of crystallized sweetener on the surface of the belt which is in contact with the cereal particles. For this reason a mesh belt can be used for long periods of time between cleanings. Another option that can be included with the invention is a means for continuously cleaning the belts as they operate. A means for cleaning the belt can remove excess crystallized sweetener collected on the belt by mechanical wiping, high pressure air or steam application, fluid spraying followed by drying, or other suitable methods.

This invented apparatus can have a plurality of spray guns mounted in a first section or entry section of the apparatus. This first section is the portion of the apparatus through which the cereal particles are first conveyed after leaving the oven and entering this apparatus. The spray guns for purposes of this invention must satisfy Food and Drug Administration Regulations. Such spray guns must be manufactured such that all internal parts which come into contact with the sweetener solution are non-corrosive stainless steel. An example of such spray guns are manufactured by DeVilbiss Company, Spraying Systems, Inc., Wheaton, Ill., Toledo, Ohio, and others. Typically these guns are operated by compressed air and are supplied with a sweetener solution through a supply line which is separate from the compressed air supply lines. Other means for atomizing and spraying can be used with this invention. Such means can include nozzle configurations wherein the sweetener solution comes into contact with the compressed air just behind a nozzle which atomizes the solution. Alternative systems are those which can atomize the sweetener solution without the use of compressed air. Such systems can be those in which the sweetener solution is pumped under pressure to an atomizing nozzle.

A feed system as mentioned above must be provided to continuously supply a sweetener solution to the spray guns. Typically, a supply system includes a vat and supply lines. The sweetener solution can be either gravity fed or fed by one or more liquid pumps to the spray guns. When a liquid pump is used, care must be taken that any portion of the pump coming into contact with the sweetener solution is made of stainless steel parts. The rate of feed of sweetener solution to the spray guns or the concentration of sweetener in the sweetener solution can be selectively varied to control the amount of sweetener atomized and sprayed onto the cereal particles.

The supply lines used in the supply system can be stainless steel piping or flexible hosing. It is desirable to use flexible hosing to supply the sweetener solution from the sweetener solution vat to a stainless steel pipe which in turn feeds the individual spray guns. Flexible hosing can facilitate cleaning operations because of their ease of manipulation during cleaning operations. Numerous variations of this arrangement can be made and the invention is not limited by means for supplying the sweetener solution to the spray guns.

Mounted in the second section of the invented apparatus is a plurality of air flow amplifiers. Desirable air flow amplifiers operate on low pressure compressed air to direct and increase the flow of atmospheric air. The low pressure compressed air is passed into a hollow, cylindrical nozzle configuration and activates the flow of atmospheric air from behind the hollow nozzle such that it flows rapidly through the nozzle. These air flow amplifiers are supplied by the Exair Corporation, Cincinnati, Ohio, and the Vortec Corperation, Cincinnati, Ohio 45242. These driers provide numerous advantages for the invented apparatus. They rapidly dry the applied sweetener after its application to the cereal particles to a moisture content which causes the frosted coating to become very hard. This permits a continuous spraying and drying of the cereal particles and allows the cereal particles to be packaged without any further cooling or prolonged drying. This continuous drying in conjunction with the continuous spraying of the sweetener solution allows for a rapid, continuously operating system for applying a sugar frosting to cereal particles. The use of the air flow amplifiers allows this apparatus to use room temperature gas or air. This provides an energy savings in that the air drying of the frosted cereal particles does not have to be heated in order to drive off excess moisture in the applied frosting. Additionally, these air flow amplifiers, because they operate on low pressure compressed air, operate at a low noise level when compared to high pressure compressed air nozzles.

The compressed air pressure supply system for the spray guns can be the same compressed air supply system used to operate the air flow amplifiers. Such an arrangement reduces the amount of compressed air equipment required for the operation of the first and second apparatus sections of the invention. The air used to operate the spray guns and the air flow amplifiers must be FDA approved food grade clean air. Such air can be provided by a compressed air supply system wherein no oil or other extraneous matter comes into contact with the compressed air. Filters can be included in the compressed air supply system to further purify the compressed air.

Dust shields can be mounted around the support members of this apparatus. These dust shields can be metal or plastic sheeting and prevent the escape of the atomized and sprayed sweetener solution into the atmosphere of the food processing plant. Additionally, dust shields can prevent contamination of the cereal particles while the sticky sweetener solution is being applied or during the drying operation.

This apparatus has the desirable quality that upon completion of its operation it can be cleaned by flowing a cleaning solution through the fluid manifold system. The cleaning solution can dissolve any sugar sediments in the fluid manifold system without disassembly. Additionally, cleaning can occur immediately after operation of this apparatus, because the apparatus operates with room temperature air. After pumping the cleaning solution through the apparatus, the cleaning solution can be removed by a water rinse. This facilitated cleaning operation increases the efficiency of the maintenance of this piece of equipment and reduces the amount of man hours which must be devoted to cleaning the sweetener applying apparatus on a food stuff production line.

FIG. 1 illustrates the essential elements of the preferred embodiment of this invention. Support means 1 are affixed to a manifolds 2 or 12 that are horizontal over a conveyor means 3. The manifolds 2 or 12 can be mounted directly to the support means 1 or by additional brackets or cross members which affix the manifolds 2 or 12 to the support means 1. Affixed to the manifolds are spray guns 4 which are connected to the manifolds 2 or 12 by flexible hosing or piping. In the preferred embodiment of this invention 28 spray guns 4 are mounted in a series of four rows with seven spray guns each spaced about 9½ inches apart from one another over the conveyor means 3 in the first apparatus section. The number, type, and spatial arrangement of spray guns can be selectively varied to apply a sufficient or desired amount of sprayed sweetener on the conveyed food stuffs. A vat 5 supplies sweetener solution via supply line 6 by a stainless steel positive displacement pump (not shown) to a sweetener supply pipe 7 that feeds the individual spray guns 4.

In the second apparatus section, a plurality of air flow amplifiers 8 are mounted over the conveyor means 3. In desirable embodiments air flow amplifiers are mounted in 2 to 5 headers of 30 to 50 amplifiers each contingent upon the width of the conveyor belt or surface to be covered. The air flow amplifiers approximately one and one-half inches apart from each other's center line on the header. Both the spray guns 4 and the air flow amplifiers 8 are directed to provide a downward spraying or flow of, respectively, atomized sweetener or air. This configuration can be altered in numerous ways to include spray guns and air flow amplifiers which are directed at the cereal particles from the side of the conveyor means or even upwardly directed through a mesh conveyor belt to coat the underside of the cereal particles.

In the preferred embodiment a source 9 is a means of supplying food grade clean, compressed room temperature air. Room temperature for purposes of this invention is between about 55° F. and about 120° F. The compressed air is supplied through compressed air lines 10, 11, and 14. The compressed air is fed into the manifolds 2, 12, and 13 which direct the air flow to either the spray guns 4 and the air flow amplifiers 8. In the preferred embodiment the spray guns 4 are operated between approximately 30 and approximately 75 psi, with the ideal operating pressure being between 45 and 60 psi. The rate of air flow can be varied to control the amount of micronized sweetener particle sizes applied to the cereal particles. In the preferred embodiment air line or manifold 12 is a one and one quarter inch stainless steel pipe which supplies atomization or "cap" air to the spray guns 4. Air line or manifold 13 is a one-quarter inch stainless steel pipe configured to step down the air pressure to between about 20 and about 40 psi. The stepped down air pressure is used to activate a needle within the spray nozzle for self cleaning. This configuration can be varied depending upon the spray guns selected. Manufacturers of spray guns typically provide the information required to select air pressures to operate their equipment.

In the preferred embodiment the compressed air to the air flow amplifiers is also stepped down by any conventional means for reducing air pressure to an air pressure of between about 20 and about 40 psi with the most desirable range being between 20 and 30 psi. This air pressure range is suitable to operate the disclosed header arrangement of dryers used in the preferred embodiment of the invention to provide rapid continuous drying of the applied frosted coating. This arrangement can also be selectively varied to provide a sufficient rate of drying of the frosted coating applied to the conveyed food stuffs.

The present invention also provides a method for sweetening any food stuff or a ready-to-eat breakfast cereal. The frosting for the preferred embodiment of this invention is applied to a shredded wheat cereal. Other cereal particles can be used, whether they are shredded, puffed, or flaked, and regardless of their grain content. Any suitable natural or artificial sweetener mixture that crystallizes upon atomized spraying is suitable for use with the apparatus of this invention. The preferred embodiment of the method of this invention produces a frosted coating having a snow-like appearance. Other sweeteners can be used with the invented method, but not all sweeteners produce a fluffy, snow-like appearance. This invented method is not limited by the sweetener solution chosen.

A sweetener solution is prepared in the preferred embodiment by adding about 85% powdered sugar, about 14.25% water, about 0.5% gelatin, and about 0.025% glycerin together and mixing these ingredients at a temperature of 110° F. The sweetener solution can be mixed by any conventional means known in the art. It has been found that the desired result of producing a snow-like frosting is achieved when the mixture has an initial density of approximately 120 to approximately 140 grams per 100 cc at a temperature of 110° F. The sweetener solution is then placed in a holding vessel or vat. The sweetener solution is pumped to a means for atomizing and spraying such as the spray guns described above and atomized and sprayed onto the food stuff or cereal particles. The crystal size of the atomized frosting spray applied to the cereal particles is typically between about 30 and about 50 microns. The frosted cereal particles are then dried by a means for drying or air flow amplifiers which use compressed air at room temperature. The resulting product is a frosted cereal particle with a snow-like appearance.

In other desirable embodiments, a sweetener solution can be prepared with a sweetener that is a member selected from a group consisting of sucrose, dextrose, fructose, glucose, saccharin, aspartame or mixtures of these. Selected sweetener solutions can be varied to include minor non-sweetening ingredients to effect the viscosity, density, or other characteristics of the solution or applied frosted coating.

The resulting frosted cereal product has all the advantages of crystalline sugar coated products. The frosted cereal pieces are not sticky and do not absorb moisture readily. The fluffy snow-like appearance of the frosted coating is appealing to consumers and provides an alternative in appearance to a conventional frosted coated cereal.

The method of this invention is further understood by the examples below.

EXAMPLE I

In the preferred embodiment of the invented method a sweetener solution is prepared by adding 85% powdered sugar, 14.25% water, 0.5% gelatin, and 0.025% glycerin. These ingredients are mixed at 110° F. The mixture is then pumped into a holding vessel. The density of the solution is at 130 grams per 100 cubic centimeters. The sweetener solution is then pumped through supply lines to four rows of seven spray guns spaced 9½ inches apart. The sweetener solution is atomized and sprayed onto shredded wheat cereal particles passing through a first apparatus section on a conveyor belt below the spray guns. The average spray droplet crystal size of the frosting spray is in a range between about 30 and about 50 microns. After the shredded cereal particles are sprayed, they are further conveyed to a second apparatus section and dried until the frosting reaches a moisture content of approximately 5% or less. The resulting product has a hard frosted coating with a snow-like appearance and is packaged and ready for shipping.

EXAMPLE II

In this embodiment of the invented method a baked pastry is conveyed through the apparatus used in Example I. The sweetener solution is the same as used in Example I except that the glycerin is removed and replaced with additional water. The pastry has a frosted coating applied which has a snow-like appearance.

What is claimed is:

1. A method, comprising:
   preparing a sweetener solution;
   spraying said sweetener solution onto cereal particles by a means for atomizing and spraying for a sufficient time to form a frosted coating;
   drying said frosted cereal particles by a means for drying, said means for drying utilizes room temperature air.

2. The method of claim 1, wherein said sweetener solution is 85% sweetener, 14.25% water, 0.5% gelatin, and 0.025% glycerin.

3. The process according to claim 1, wherein the sweetener is a member selected from a group consisting of sucrose, dextrose, fructose, glucose, saccharin, aspartame, or mixtures of these.

4. A process as claimed in claim 1, wherein an average spray droplet crystal size of said atomized and sprayed sweetener is between about 30 and about 50 microns.

5. A method comprising:

conveying a plurality of cereal particles through an apparatus;

atomizing and spraying a sweetener solution through a plurality of spray guns mounted in a first section of said apparatus onto said cereal particles;

drying said sprayed cereal particles using a plurality of air flow amplifiers mounted in a second section of said apparatus.

6. The method of claim 5, wherein said sweetener solution is 85% sweetener, 14.25% water, 0.5% gelatin, and 0.025% glycerin.

7. The process according to claim 5, wherein the sweetener is a member selected from a group consisting of sucrose, dextrose, fructose, glucose, saccharin, aspartame, or mixtures of these.

8. A process as claimed in claim 5, wherein an average spray droplet crystal size of said atomized and sprayed sweetener is between about 30 and about 50 microns.

* * * * *